US007218772B2

(12) United States Patent
Gleason et al.

(10) Patent No.: US 7,218,772 B2
(45) Date of Patent: May 15, 2007

(54) METHOD FOR NON-REFERENTIAL DEFECT CHARACTERIZATION USING FRACTAL ENCODING AND ACTIVE CONTOURS

(75) Inventors: Shaun S. Gleason, Knoxville, TN (US); Hamed Sari-Sarraf, Lubbock, TX (US)

(73) Assignee: Ut-Battelle LLC, Oak Ridge, TN (US)

( * ) Notice: Subject to any disclaimer, the term of this patent is extended or adjusted under 35 U.S.C. 154(b) by 491 days.

(21) Appl. No.: 10/166,296

(22) Filed: Jun. 10, 2002

(65) Prior Publication Data

US 2003/0228051 A1    Dec. 11, 2003

(51) Int. Cl.
*G06K 9/00* (2006.01)

(52) U.S. Cl. ............... 382/149; 382/141; 382/145; 382/147; 382/232; 382/249; 700/110; 702/35

(58) Field of Classification Search ............ 382/141, 382/145, 147, 149, 232, 242, 249; 348/86, 348/87, 125, 126; 700/110; 438/16; 702/35
See application file for complete search history.

(56) References Cited

U.S. PATENT DOCUMENTS

| 5,815,198 A | * | 9/1998 | Vachtsevanos et al. ....... 348/88 |
| 6,154,561 A | * | 11/2000 | Pratt et al. ................. 382/141 |
| 6,292,582 B1 | * | 9/2001 | Lin et al. .................... 382/149 |
| 6,400,996 B1 | * | 6/2002 | Hoffberg et al. ............. 700/83 |
| 6,473,665 B2 | * | 10/2002 | Mugibayashi et al. ...... 700/110 |
| 6,757,444 B2 | * | 6/2004 | Matsugu et al. ............ 382/283 |

FOREIGN PATENT DOCUMENTS

WO    WO 01/22270 A2    3/2001

OTHER PUBLICATIONS

Xu et al., Gradient Vector Flow: A New External Force for Snakes, Jun. 1997, IEEE, pp. 66-71.*
Kim et al., Fractal Coding of Video Sequence USing Circular Prediction MAping and Noncontractive Interframe Mapping, Apr. 1998, IEEE, pp. 601-604.*
Zhao et al., Multiple same-sized block mapping for recursive fractal image coding, Feb. 2002, Optical Engineering, vol. 41, No. 2, pp. 328-334.*
Jatko, et al., et al. "Nonlinear Filter Derived from Topological Image Features" Proc. Int. Soc. for Optical Engineering Conf., Orlando, FL, 1990.

(Continued)

*Primary Examiner*—Bhavesh M Mehta
*Assistant Examiner*—John Strege
(74) *Attorney, Agent, or Firm*—Akerman Senterfitt; Neil R. Jetter

(57) ABSTRACT

A method for identification of anomalous structures, such as defects, includes the steps of providing a digital image and applying fractal encoding to identify a location of at least one anomalous portion of the image. The method does not require a reference image to identify the location of the anomalous portion. The method can further include the step of initializing an active contour based on the location information obtained from the fractal encoding step and deforming an active contour to enhance the boundary delineation of the anomalous portion.

12 Claims, 2 Drawing Sheets

OTHER PUBLICATIONS

Gleason, et al. "Higher Accuracy and Throughput in Computer-Aided Screening of Mammorgraphic Microcalcifications" Proc. of the IEEE Nuclear Science Symposium and Medical Imaging Conference, Nov. 1997.

Sari-Sarraf, et al. "Front-End Data Reduction in Computer-Aided Diagnosis of Mammograms: A Pilot Study" Proc. SPIE Medical Imaging Conf., San Diego, CA, Feb. 1999.

Sari, Sarraf, et al. "A Novel Approach to Computer-Aided Diagnosis of Mammographic Images" Proc. 3rd IEEE Workshop on Applications of Computer Vision, Sarasota, FL, Dec. 1996.

Gleason, et al. "Detection of Semiconductor Defects Using a Novel Fractal Encoding Algorithm" Design, Process Integration and Diagnostics in IC Manufacturing, Proceedings of the SPIE, vol. 4692, Mar. 2002.

U.S. Appl. No. 09/399,019, filed Sep. 20, 1999, entitled "Method for Localizing and Isolating an Errant Process Step".

U.S. Appl. No. 09/399,394, filed Sep. 20, 1999, entitled "Method for Indexing and Retrieving Manufacturing-Specific Digital Imagery Based on Image Content".

* cited by examiner

METHOD FOR NON-REFERENTIAL DEFECT CHARACTERIZATION USING FRACTAL ENCODING AND ACTIVE CONTOURS

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATIONS

Not applicable.

FIELD OF THE INVENTION

The invention relates to a method and system for the detection of anomalous structures in an image using fractal encoding.

BACKGROUND OF THE INVENTION

Detection of defects or anomalous structures is a common problem in applications where digital imaging techniques are used to monitor a process. This is especially common in manufacturing operations where digital cameras are commonly used as "computer vision systems" to acquire images of products as they are being manufactured. Images obtained can be used to identify and remove (or rework) defective manufactured products that can otherwise lead to product malfunction.

The most common techniques used to detect defects in digital images are reference-based. Referenced-based techniques rely on a reference image of a defect-free object to be used as a means of comparison. In the referenced-based technique, an image of a defect-free object is acquired, stored, and then used as a reference image. The reference image is sometimes referred to as a "golden image." Image processing techniques are used to detect the differences between the golden image and an image of a new object. The detected differences between the images are then labeled as defects.

There are many applications in which a reference image is either unavailable or of insufficient quality to be used as a reliable basis for comparison. Detecting defects without the aid of a reference image is a difficult task for an automated computer vision system. If a reference (defect-free) image is unavailable, or is of insufficient quality to allow it to be used for defect detection, then non-reference based defect detection approaches must generally be used. However, to-date there are no available non-reference based methods for defect detection that consistently produce acceptable results. Moreover, available automated detection techniques are highly application specific in that the image processing techniques used are tuned for the specific object and background that are expected to be present in the image. As a result, such systems typically have limited application.

SUMMARY OF INVENTION

The invention includes a computer vision-based system for non-referential anomalous feature characterization of digital images. Fractal encoding is used to approximate the locations of one or more anomalous features, such as defects. In certain applications, the fractal encoding step alone can adequately locate anomalous regions, such as those including defects.

In some applications, the fractal encoding step alone may not be sufficient to locate the anomalous regions with sufficient accuracy. In these instances, the fractal encoded data may be used to initialize and optimize an active contour to more precisely locate the boundary of the anomalous feature. Unlike conventional automated detection techniques which are highly application specific, the invention has broader application since the fractal based method is not highly dependent on the type of object and background in the image being analyzed.

A method for identification of anomalous structures including defects includes the steps of providing a digital image and applying fractal encoding to identify a location of at least one anomalous portion within the image. The method can include the steps of initializing an active contour based on the location obtained from the fractal encoding step and deforming an active contour to enhance the boundary of the anomalous portion. The active contour can be initialized along a perimeter of the identified location. The fractal encoding step can comprise non-contractive mapping.

The fractal encoding step can include the steps of mapping a plurality of domain subregions into a plurality of range subregions, and computing a similarity parameter for each of the range subregions. The similarity parameter can be based on the ability of each of the range subregions to be represented by the mapping. In this embodiment, the method preferably includes the step of identifying respective range subregions having low relative similarity parameter values as suspected anomalous portions. Adjacent ones of the suspected anomalous portions can be combined to form combined anomalous portions and identifying a largest of the combined anomalous portions.

The at least one anomalous portion can include comprise a plurality of anomalous portions. When a plurality of anomalous portions are identified, the method can include the step of selecting a subset of the plurality of anomalous portions based the location or size of the respective anomalous portions.

The digital image can be the image of a semiconductor circuit. The image provided can be from a scanning electron microscope (SEM) image or from an optical microscope.

A method for dividing a database of images into defect and background portions includes the steps of providing an image and applying fractal encoding to identify a location of at least one anomalous portion within the image, wherein features are extracted separately from the defect portions and the background portions. A content-based image retrieval system is used to search the database for images that have specific defects or the background characteristics.

A system for identification of anomalous structures includes structure for applying fractal encoding to an image and structure for identifying a location of at least one anomalous portion within the image. The system permits the location to be obtained without a reference image. The system can include structure for deforming an active contour to fit or enhance the fit of a boundary relating to the anomalous portion.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Figure 1:
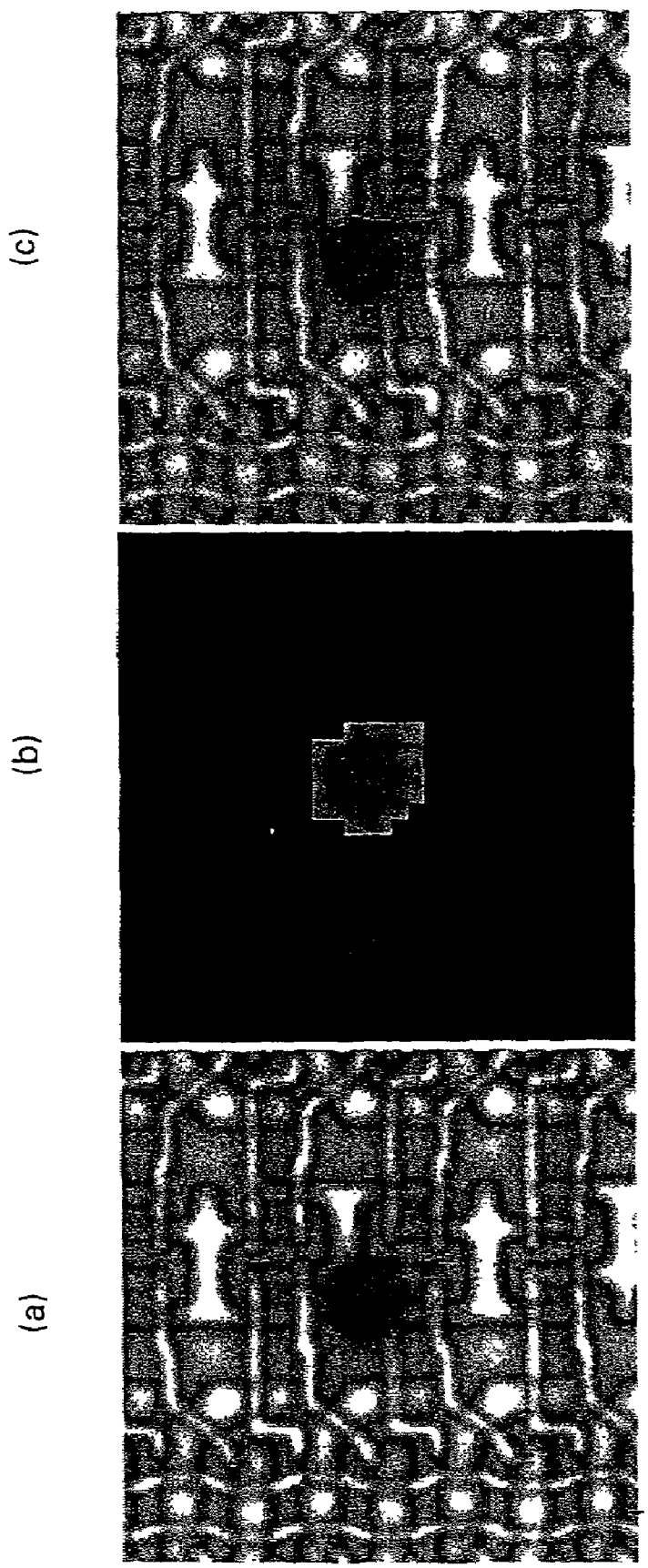
FIG. 1(a) illustrates an image of a semiconductor circuit portion which includes a defective area.
FIG. 1(b) illustrates a fractal encoded image of the defective area shown in FIG. 1(a) identified using fractal encoding.
FIG. 1(c) illustrates an optimized active contour which further delineates the boundary of the defective area shown in FIG. 1(a) and the fractal image thereof in FIG. 1(b).

This invention is a computer vision-based system and method capable of performing automated non-referential anomalous structure identification within digital images. Fractal encoding is applied to the image under test. The image can be an image digitized in real time or a stored digital image, such as from a stored database. For example, the image can be a digital image acquired by a scanning electron microscope (SEM) or an optical microscope.

Fractal encoding is the basis of fractal image compression algorithms, but has been modified herein so that it can be used as a tool for detection of anomalous features, such as defects. Fractal encoding partitions an image into subregions, and then generates transformation parameters including a set of affine transformations that transform one subregion of an image (the domain (D)) into a new subregion that approximately matches a similar subregion located somewhere else within the same image (the range (R)).

Affine transformations include translation, scaling, and rotation. Scaling typically involves image downsizing as mapping used in fractal encoding is typically contractive. However, depending on the application image, the fractal mapping performed using the invention need not always be contractive. In addition, intensity transformations may also be applied to the image subregions that include intensity scaling and intensity offset. Again, these scaling and offset factors (e.g. brightness) are sometimes used, but are not a requirement.

If an image is highly "self-similar," then many range subregions can be effectively represented by a substantial number of other transformed domain subregions within that same image. Exact self-similarity means that the fractal object is composed of scaled down copies of itself that are translated, scaled and rotated, according to a predescribed mapping or transformation. On the other hand, there may be one or more subregions within the image that contain anomalous data, such as object defects that differ from the general image characteristics. In that case, the fractal encoding process will find few, if any, similar subregions within the image.

Self-similarity is an image quality that is exploited in fractal image compression schemes in that a subregion in one area of an image is described by a mathematical transformation of another subregion within that same image. Storing this information requires less space (e.g. bits) than storing an image subregion, therefore data storage requirements are less and image compression is achieved. However, the objective of the invention is anomalous region detection, not the conventional image compression objective for fractal encoding.

In general, real images do not exhibit exact self-similarity, but they do exhibit partitioned self-similarity. Instead of being formed of copies of its whole self, the image is composed of properly transformed parts of itself. Fractal encoding exploits the property of "partitioned" self-similarity of images. This means that instead of being formed of copies of its whole self (as in exact self-similarity), the image, in an approximate sense, is composed of transformed parts of itself. In computing the coefficients of this transformation or map, it is assumed that because of the notion of partitioned self-similarity, each subregion of the image can be described, in the sense of minimizing a dissimilarity metric, in terms of another. The former subregion belongs to the range pool, R, while the latter belongs to the domain pool, D, of the map.

If a given subregion in D cannot be effectively mapped to any region in R so that a similarity metric between the regions falls above a specified threshold, then R can be further partitioned into smaller subregions. This process can be continued recursively until either a similar subregion from D is found or a specified maximum level of partitioning, $L_{max}$, is reached. The range pool partitioning scheme can take on a variety of forms. For example, the commonly utilized quadtree partitioning scheme can be used.

As the fractal encoding process maps domain subregions to range subregions, a parameter termed a "similarity metric" is calculated that records how well each range subregion is represented by the result of the corresponding transformation of the domain sub-image. If this similarity metric for a given image subregion is relatively low, then that subregion can be identified as being different from the normal background structure within the image. Once the fractal encoding process is complete for the image, all of the identified image subregions can be collected as potential image regions containing anomalies, such as defects.

A connectivity analysis can then be performed on the potentially anomalous (e.g. defective) subregions previously identified. First, adjacent regions are grouped together and subsequently treated as a single defective area. For example, fractal-encoded regions can include regions with low similarity metrics as well as their 8-nearest neighbors.

A next step in the connectivity analysis is generally to pick out the largest defective area in the image and designate it as the one with the largest probability of containing a defect. The other smaller, isolated defect areas may be discarded before moving to the final step in the defect detection process, which is enhanced defect boundary identification. Another factor that helps determine which of the defective regions to keep for further processing is the most likely location of the defect. There are some applications in which the defect is expected to be near the center of the image. In these applications, the location of the defective region is also considered when deciding which regions to keep for further processing.

Active contours or snakes are parameterized curves that can be deformed to fit an object or defect within an image. Active contours are constrained by local smoothness parameters and have no overall shape constraints. Internal energy concepts are widely used in current algorithm development strategies for many boundary-based segmentation techniques, such as active contours. The energy function can be modeled by internal and external energy forces as follows:

$$E_{total} = \int_0^1 E_{snake}(v(s))ds = \int_0^1 (E_{int}(v(s)) + E_{ext}(v(s))ds$$

where $$E_{ext}(v(s))=E_{image}(v(s))+E_{com}(v(s)),$$

v(s) is the parameterized contour [x(s), y(s)], $E_{int}$ represents the internal energy of the spline (a piece-wise, smooth polynomial function) due to bending, $E_{image}$ represents forces imposed by the target image, and $E_{con}$ represents external constraint forces that the user may impose. For contours, the internal energy is related to the smoothness of the active contour, and the external energy is based on edge information in the target image.

The main limitation of active contours in practical applications is that they must generally be initialized close to the boundary that is to be delineated, otherwise the method will not typically converge to the correct solution. In general, the approximate shape and location of the anomalous feature boundary is unknown, so that the proper initialization of the active contour is generally difficult to obtain, thus limiting the use of active contours to the few applications where good initial guesses regarding spatial information can be provided.

The fractal encoding step, however, can provide a good approximate shape and location for the defect boundary for the active contour to initiate from. For example, if a quadtree partitioning scheme is used in the fractal encoding step, the detected anomalous subregion consists of a collection of adjacent squares that collectively cover the anomalous subregion. If it is desired to further delineate the boundary of the anomalous subregion, the perimeter of the anomalous subregion identified via the fractal encoding step can be used as an initial starting point for the location and shape of the defect boundary for application of the active contour. In this optional step, the active contour can be initialized to be coincident with the perimeter of the anomalous area. The active contour can then be deformed via an optimization process to best fit the defect boundary.

To further clarify the invention, the fractal encoding and the optional active contour step will be restated with reference to an illustration of the invention applied to a semiconductor production process along with an accompanying flowchart. The images are shown in FIG. 1(a)–(c), while the flowchart is shown in FIG. 2.

Figure 2:
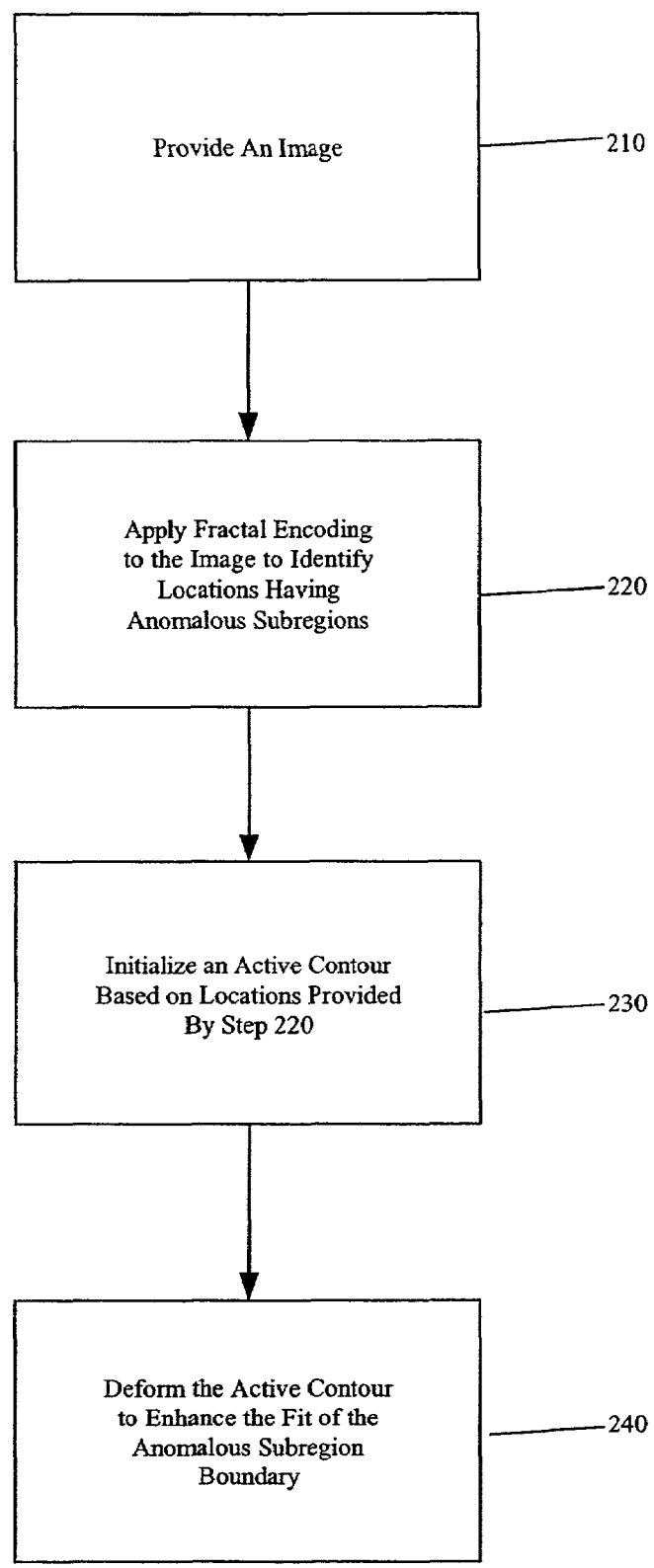
FIG. 2 is a flow chart showing various steps in the fractal-based non-referential defect characterization method.

FIG. 1(a) illustrates an image of a semiconductor circuit portion which includes a defective area. In a first step, step 210, the image shown in FIG. 1(a) is provided, in digital form. In step 220, fractal encoding is applied to the image, and then locations of the anomalous (e.g. defective) subregions within the image are identified. The affine transformations used to perform the sub-region mapping in this example are scaling, rotation and translation. FIG. 1(b) illustrates a fractal encoded image of the defective area detected using fractal encoding. The information provided by step 220 may be sufficient to identify defects or other anomalous features in some applications.

If enhanced defect delineation is desired, an active contour step 230 can be used. In this step, the active contours are initialized based on the location provided 20 by fractal encoding step 220, such as the perimeter of the selected (e.g. largest) defective area. The internal energy term used for the active contour in this example are x- and y-gradient images calculated from the result of a Canny-edge detector applied to the original image. The external energy term is derived from the smoothness of the resulting spline that represents the boundary. The active contour is deformed in step 240 to fit the defect boundary provided by the fractal encoding step. FIG. 1(c) illustrates an optimized active contour shown which further delineates the boundary of the defective area previously identified by the fractal encoding step 220.

The invention includes several new features. As noted above, a reference image is not required for anomalous feature detection. Fractal encoding is also used for defect detection, rather than its typical image compression function. The fractal mapping performed does not require image downsizing, which is generally always performed in conventional fractal encoding. In addition, fractal-encoded regions identified as being anomalous can be filtered to select the most likely region that contains an anomalous feature (e.g. defect) based on the location and/or size of the anomalous region. Finally, active contour initialization can be based on the perimeter of the fractal encoded regions determined by the fractal encoding step.

The invention can also be used to detect structure other than defects within a digital image of a scene. Applications requiring location of anomalous structure that differs from the inherent image characteristics can benefit from this invention. For example, the invention can be used to non-referentially automatically detect man-made structures, such as vehicles and buildings, within an image of a natural scene, such as woods, fields or mountains.

The invention can be used for non-referential defect detection within computer vision systems. For example, the invention can be used for inspection of manufactured components, such as semiconductors circuits, inspection of printed material (e.g. currency), and the detection of man-made structures within natural environments (reconnaissance).

In one embodiment of the invention, the anomalous structures to be identified are semiconductor defects. Application to semiconductor manufacturing is a useful application for the invention since semiconductor manufacturers generally have large stored databases of defect imagery, but do not have the corresponding reference images.

In semiconductor or related fabrication process (e.g. optoelectronics), each die is formed by deposition of about a dozen layers, including metal films, insulating material, and semiconducting material with electrical contacts to make transistors. With a plurality of steps and materials involved, defective dies can be formed. For example, a drop of water or a flake of dirt, metal, or polymer from a previous step can end up on the wrong layer. A layer may be missing a circuit pattern or it may be imprinted with an extra pattern. A series of dies might have the same defect stemming from a scratch on the wafer resulting from improper mechanical handling by a robot. The invention can be used to detect any of the above defect types and a variety of other defects, including new defect types which cannot be ascertained from a review of previously obtained images.

The invention can also be applied to processes related to semiconductor processing, such as MEMS processing and devices. Applied to MEMS devices, the invention can be used to detect defects on movable structures thereon as well as the supporting integrated circuit components.

The invention can also be used for large databases of digital images that contain defect images of manufacturing processes to separate these images into defective areas and background areas. This can allow features to be extracted separately from the defect areas and the background areas. Content-based image retrieval systems, such as disclosed in PCT Application No. PCT/US00/40959 entitled "Method for Indexing and Retrieving Manufacturing-Specific Digital Imagery Based on Image Content", published in March 2001, could then search these large stored databases for images that have selected specific defect and/or background features.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A method for identification of anomalous structures including defects, comprising the steps of:
   providing a digital image;
   applying fractal encoding to identify a location of at least one anomalous portion within said image, and
   initializing an active contour based on said location obtained from said fractal encoding step and deforming an active contour to enhance a boundary of said anomalous portion, wherein said image is acquired at a single instant of time, said fractal encoding comprising non-contractive mapping.

2. The method of claim 1, wherein said active contour is initialized at a perimeter of said location.

3. The method of claim 1, wherein said fractal encoding comprises mapping a plurality of domain subregions into a plurality of range subregions, further comprising the step of compiling a similarity parameter for each of said range subregions, said similarity parameter based on the ability of each of said range subregions to be represented by said mapping.

4. The method of claim 3, further comprising the step identifying respective ones of said range subregions having low relative similarity parameter values as suspected anomalous portions.

5. The method of claim 4, further comprising the steps of combining adjacent ones of said suspected anomalous portions to form combined anomalous portions and identifying a largest of said combined anomalous portions.

6. The method of claim 1, wherein said at least one anomalous portion comprises a plurality of anomalous portions, further comprising the step of selecting a subset of said plurality of anomalous portions based on at least one of said location and a size of said anomalous portions.

7. The method of claim 1, wherein said image is an image of a semiconductor circuit.

8. The method of claim 1, wherein said image is a scanning electron microscope (SEM) image or an image from an optical microscope.

9. The method of claim 1, wherein said digital image is of a man-made structure.

10. A system for identification of anomalous structures, comprising:
    structure for applying fractal encoding to an image, and
    structure for identifying a location corresponding to at least one anomalous portion within said image comprising structure for initializing an active contour based on said location obtained from said fractal encoding and deforming an active contour to enhance a boundary relating to said anomalous portion, said location being obtainable without a reference image, wherein said system employs non-contractive fractal encoding.

11. The system of claim 10, wherein said system employs region selection based on size and location, followed by active contour initialization and iterative contour adjustment to locate borders of said anomalous portion.

12. The system of claim 10, wherein said digital image is of a man-made structure.

* * * * *